Figure 1:
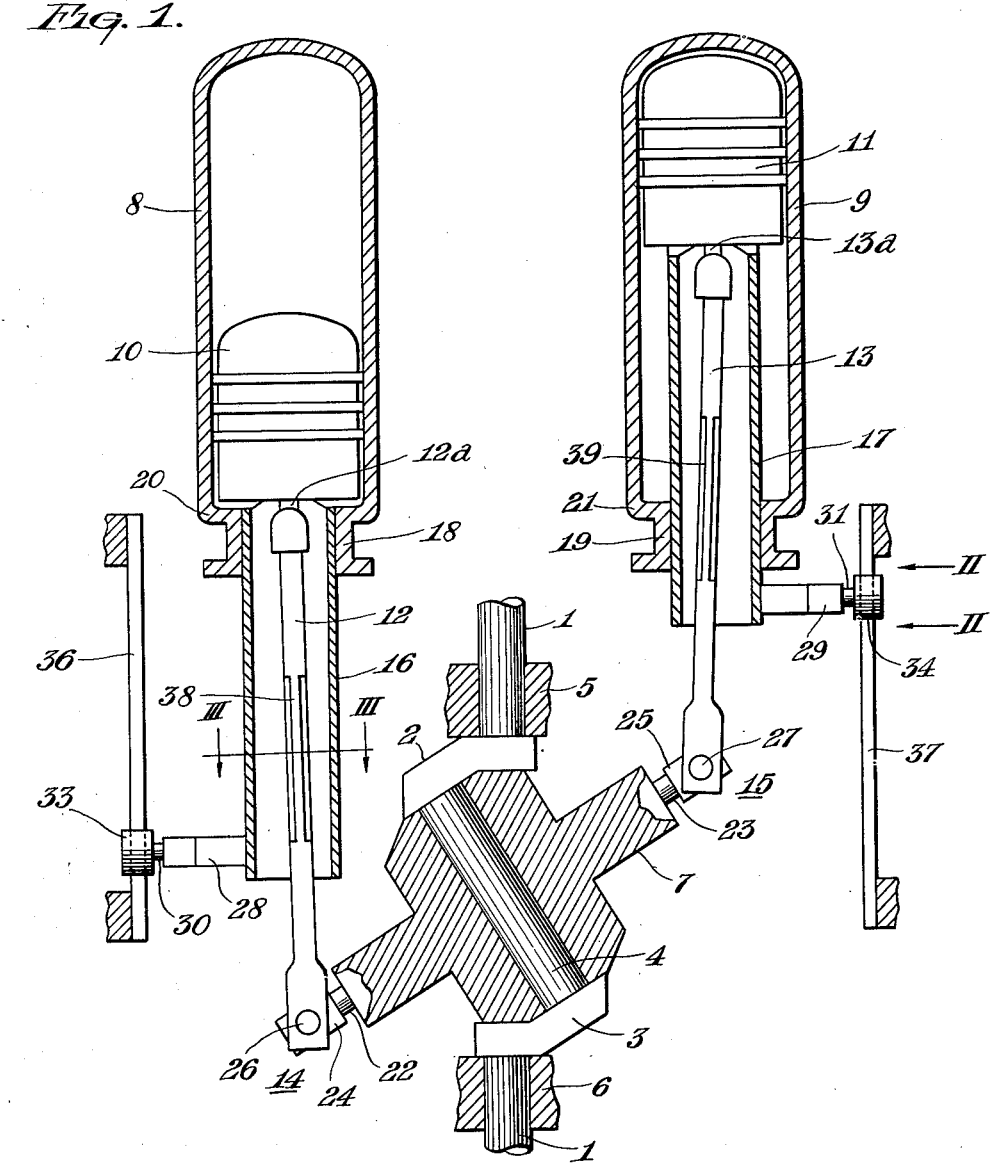

March 25, 1952        H. RINIA        2,590,573

PISTON APPARATUS COMPRISING A BELL CRANK CAM DRIVE

Filed Dec. 26, 1946

INVENTOR.
HERRE RINIA.
BY C. F. Vtenderoth
ATTORNEY.

Patented Mar. 25, 1952

2,590,573

UNITED STATES PATENT OFFICE 2,590,573

PISTON APPARATUS COMPRISING A BELL CRANK CAM DRIVE

Herre Rinia, Eindhoven, Netherlands, assignor to Hartford National Bank and Trust Company, Hartford, Conn., as trustee Application December 26, 1946, Serial No. 718,578
In the Netherlands February 25, 1946

1 Claim. (Cl. 74—60)

Connecting rods used in bell crank cam drives can be coupled in different ways with the bell crank cam and with the reciprocating bodies, such as pistons, coupled with the bell crank cam, by means of the said rods. It is known to use for this purpose ball-and-socket joint pivots, which, however, though having three degrees of freedom of motion, are not particularly satisfactory in practice, because they are not well adapted for the transmission of great forces. That's why in apparatus comprising a bell crank cam drive the junction between the bell crank cam and the connecting rods is sometimes constituted by the gimbal ring joints, which exhibit two degrees of freedom of motion and which are then used in such manner that the connecting rods secured to the bell crank cam by means of such a gimbal construction are individually adapted to move in two planes passing through the longitudinal axis of the connecting rod concerned, said planes being set at an angle of 90° with each another. This means that, when the apparatus is in use owing to the movement which they get from the bell crank cam the connecting rods will also slightly turn forwards and backwards about their axis with the result that the body, say a piston, secured to such a connecting rod in addition to performing the reciprocating movement aimed at, will tend to pivot about its longitudinal axis.

During the operation of the apparatus in which such a bell crank cam drive is used the mass of this body, by reason of this rotary movement, subjects the driving rod concerned to torsion. If the speed of the bell crank cam mechanism is high, for example, if it exceeds 500 revolutions in the minute, and/or if the mass of the body secured to the connecting rods is large, torsional oscillations are liable to occur and may be fatal for the connecting rods.

The present invention has for its object to provide means by which this difficulty is obviated.

The piston apparatus comprising a bell crank cam drive according to the invention, in which the connecting rods and the bell crank cam are joined by means of a gimbal ring, exhibits the feature that each of the pistons is guided in such manner that it can only perform a reciprocating movement.

It has now been found that by such procedure the connecting rods are by no means excessively strained by the reciprocating torsion imposed on them by the bell crank cam, this torsion being due to the fact that whereas at the area where they are secured to the pistons the piston rods solely or almost solely perform a reciprocating movement the end of each of the connecting rods which is secured on the bell crank cam is forced by the movement of the bell crank cam to perform not only the reciprocating movement but also a rocking movement.

In one form of construction of the machine according to the invention, each of the pistons is provided with a constructional part not capable of being rotated relatively to the piston concerned; this constructional part is engaged outside the cylinder by a straight guide and may be formed by the piston rod. This piston rod will generally be found in constructions comprising a double-acting piston and the piston rod is taken to the outside through a stuffing box in the cylinder head.

In the apparatus according to the invention the connecting rods are preferably so constructed as to exhibit less torsion resistance for part of their length than for the remaining part and this may be realized in practice, for example, by imparting such a cross section to the first mentioned part that it comprises a central part and several flanks radially extending from it.

In order that the invention may be clearly understood and readily carried into effect, it will now be described more fully with reference to the accompanying drawing.

Figure 2:
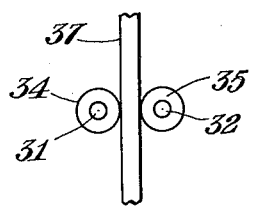
Figure 3:
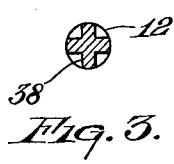

Fig. 1 is a diagrammatic view of piston apparatus comprising a bell crank cam drive, whereas Fig. 2 is an elevation of the straight guide according to the arrows II—II. Fig. 3 is a sectional view taken on the line III—III of Fig. 1.

The main shaft of the apparatus is designated 1. The projecting parts 2 and 3 found on this shaft are separated by a slanting part 4; in view of this it should be observed that the shaft 1 is integral with the parts 2, 3 and 4. The main shaft 1 is supported in the bearings 5 and 6. A bell crank cam 7 is free to rotate on the shaft part 4, for the sake of simplicity the bearings between the shaft part 4 and the bell crank cam 7 are omitted. The bell crank cam 7 has coupled with it four pistons which are adapted to move in cylinders, the centre lines of which are parallel. The drawing only shows two of these cylinders which are designated 8 and 9. The supply and outlet ports pertaining to these cylinders have been omitted. Double acting pistons 10 and 11 are adapted to move in the cylinders 8 and 9. By means of connecting rods 12 and 13 they are coupled with the bell crank cam 7 through gimbal ring joints 14 and 15. The bottoms of the pistons 10 and 11 have secured to them piston rods 16 and 17 which are guided by stuffing boxes 18 and 19 (diagrammatically shown) in the bottom heads 20 and 21 of the cylinders 8 and 9. The connecting rods 12 and 13 are secured on the piston bodies 10 and 11 by means of resilient elements 12a and 13a.

The gimbal ring joints 14 and 15 comprises a studs 22 and 23 respectively which is tightly attached to the bell crank cam 7 and about which a sleeve 24 and 25 respectively is adapted to rotate. This sleeve is externally provided with two diametrically opposed protruding pins only one of which designated 26 and 27 is shown in the figure for each sleeve. The bottom ends of the connecting rods 12 and 13 are secured to these pins so as to be free to rotate.

The two piston rods 16 and 17, which cannot be turned relatively to the associated pistons 10 and 11, have secured to them at their bottom ends a projecting lug 28 and 29 respectively. At their ends these projecting lugs each carry two parallel spindles 30 and 31 (only one of them is shown in Fig. 1 for each projecting lug). Fig. 2 shows the spindles 31 and 32 associated with the projecting lug 29. Each of these spindles carries a roller (33, 34 and 35) which is free to rotate on it. As seen in the figures each of the rollers is arranged on either side of a straight guide 36 and 37 which is tightly secured to the housing of the apparatus.

When the apparatus is in use the reciprocating movement of the pistons 10 and 11 must be converted by the bell crank cam drive into a rotary movement of the shaft 1 or conversely, the bell crank cam 7 performing a rocking movement with the result that the connecting rods 12 and 13 will have to perform not only a reciprocating movement but also a rocking movement, owing to the fact that the gimbal ring joints 14 and 15 have only two degrees of freedom of motion. But for particular measures being taken this rocking movement of the connecting rods would induce the pistons 10 and 11 to perform not only a reciprocating movement but also a rocking movement which, particularly when the mechanism has a high speed, might be fatal for the life of the connecting rods, since highly prejudicial torsion oscillations are liable to occur.

Owing to the fact that the piston bodies 10 and 11 are straight guided due to the rollers moving past the straight guides 36 and 37, the piston bodies can only perform a reciprocating movement. During the operation of the apparatus the connecting rods 12 and 13 are thus subjected to torsion which, however, in practice does not lead to detrimental effects. For this purpose the connecting rods 12 and 13 preferably exhibit for part of their length less torsional rigidity than for the remaining part of the connecting rods, which in the form of construction shown in the drawing is realized by imparting to the connecting rod parts 38 and 39 a cross section which consists of a central part and several flanks radially extending from it. The connecting rods thus exhibit at the area of the parts 38 and 39 a pluslike cross-section.

What I claim is:

Piston apparatus comprising a bell crank cam drive, a cylinder, a piston mounted therein, a hollow piston rod attached to said piston and mounted for reciprocable movement in bushing means in said cylinder wall, a connecting rod within said hollow piston rod and connected at one end to said piston by resilient means and at the other end to said bell crank cam drive by gimbal ring means, said connecting rod having less torsional resistance for part of the length thereof than for the remaining part, a straight guide mounted outside said cylinder, and means attached to said piston rod and engaging said straight guide at all times whereby rotational movement of said piston in said cylinder is prevented.

HERRE RINIA.

REFERENCES CITED

The following references are of record in the file of this patent:

UNITED STATES PATENTS

| Number | Name | Date |
|---|---|---|
| 1,370,927 | Staude | Mar. 8, 1921 |
| 1,780,365 | Sherman | Nov. 4, 1930 |
| 1,867,385 | Schlenker | July 12, 1932 |
| 1,952,089 | Michell | Mar. 27, 1934 |
| 2,028,557 | Nevatt | Jan. 21, 1936 |
| 2,206,871 | Berry | July 9, 1940 |
| 2,395,911 | Schoenfeld | Mar. 5, 1946 |
| 2,436,908 | Van Weenan et al. | Mar. 2, 1948 |